United States Patent
Judd

(10) Patent No.: US 10,841,448 B2
(45) Date of Patent: Nov. 17, 2020

(54) IMAGE FORMING SYSTEM FOR COMMUNICATING WITH MOBILE TERMINAL AND SETTING MODE OF IMAGE FORMING APPARATUS

(71) Applicant: KYOCERA Document Solutions Inc., Osaka (JP)

(72) Inventor: Isaac Judd, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/937,913

(22) Filed: Mar. 28, 2018

(65) Prior Publication Data

US 2018/0288258 A1   Oct. 4, 2018

(30) Foreign Application Priority Data

Mar. 29, 2017   (JP) ................. 2017-064637

(51) Int. Cl.
*H04N 1/00* (2006.01)
*H04N 1/327* (2006.01)
*H04W 4/02* (2018.01)

(52) U.S. Cl.
CPC ..... *H04N 1/00779* (2013.01); *H04N 1/00307* (2013.01); *H04N 1/00814* (2013.01); *H04N 1/32736* (2013.01); *H04W 4/02* (2013.01); *H04N 1/3276* (2013.01); *H04N 2201/0094* (2013.01)

(58) Field of Classification Search
CPC ........... H04N 1/00994; H04N 1/00307; H04N 2201/0096; G06F 3/1292; H04W 4/02–029
See application file for complete search history.

(56) References Cited

U.S. PATENT DOCUMENTS

| 9,319,833 | B1* | 4/2016 | Greenspan | ............ H04W 4/029 |
| 2003/0164987 | A1* | 9/2003 | Enomoto | ........... H04N 1/00204 358/400 |
| 2003/0164988 | A1* | 9/2003 | Enomoto | ........... H04N 1/00204 358/400 |
| 2003/0184796 | A1* | 10/2003 | Kokubo | ............. H04N 1/00204 358/1.15 |

(Continued)

FOREIGN PATENT DOCUMENTS

JP   2006-103095 A   4/2006

*Primary Examiner* — Nicholas Pachol

(74) *Attorney, Agent, or Firm* — Studebaker & Brackett PC

(57) ABSTRACT

An image forming system includes an image forming apparatus and a mobile terminal. The mobile terminal communicates with the image forming apparatus through a communication network. Mode information is inputted to the image forming apparatus from an external device. The mode information indicates one mode among a quiet mode in which an image is formed at a predetermined formation speed, a normal mode in which the image is formed at a faster formation speed than the quiet mode, and an urgent mode in which an image forming process in the quiet mode or the normal mode is interrupted to form the image. The quiet mode is sellable on the mobile terminal. The image forming apparatus forms the image in the urgent mode when the mode information inputted from the external device indicates the urgent mode and setting information indicating the quiet mode is acquired from the mobile terminal.

2 Claims, 4 Drawing Sheets

(56) References Cited

U.S. PATENT DOCUMENTS

| | | | |
|---|---|---|---|
| 2003/0187958 A1* | 10/2003 | Aoki | H04N 1/00214 709/219 |
| 2003/0187965 A1* | 10/2003 | Enomoto | H04N 1/00204 709/221 |
| 2003/0236713 A1* | 12/2003 | Kuwabara | G06Q 10/087 705/26.1 |
| 2015/0061217 A1* | 3/2015 | Minakuchi | B65H 3/44 271/258.01 |
| 2015/0079962 A1* | 3/2015 | Baker | H04W 8/18 455/418 |
| 2015/0277815 A1* | 10/2015 | Ohhashi | G06F 3/1231 358/1.12 |
| 2016/0255234 A1* | 9/2016 | Nishihara | H04N 1/00994 358/1.13 |
| 2017/0257735 A1* | 9/2017 | Kaplan | H04W 4/023 |
| 2018/0091673 A1* | 3/2018 | Ueta | H04N 1/00822 |

\* cited by examiner

IMAGE FORMING SYSTEM FOR COMMUNICATING WITH MOBILE TERMINAL AND SETTING MODE OF IMAGE FORMING APPARATUS

INCORPORATION BY REFERENCE

The present application claims priority under 35 U.S.C. § 119 to Japanese Patent Application No. 2017-064637, filed on Mar. 29, 2017. The contents of this application are incorporated herein by reference in their entirety.

BACKGROUND

The present disclosure relates to an image forming system.

An image forming apparatus includes a printing function and a telephone function. The printing function is executed in a normal mode in which printing speed takes priority, or a quiet mode in which the printing speed is reduced. The image forming apparatus is switched from the normal mode to the quiet mode when the telephone function receives a call during execution of the printing function. In the image forming apparatus however, there is concern that operation noise of the image forming apparatus could cause discomfort to a person in proximity to the image forming apparatus when the printing function is executed in the normal mode.

An image forming system including a mobile terminal carried by the person in proximity and an image forming apparatus able to communicate with the mobile terminal is contemplated in order to prevent discomfort from being caused to the person in proximity, for example. In the image forming system, for example, the mode of the image forming apparatus is set so as to correspond with the quiet mode set from the mobile terminal. As a result, the discomfort to be received by the person in proximity is prevented.

SUMMARY

An image forming system according to the present disclosure includes an image forming apparatus and a mobile terminal. The image forming apparatus forms an image on a recording medium. The mobile terminal communicates with the image forming apparatus through a communication network. Mode information is inputted to the image forming apparatus from an external device. The mode information indicates one mode among a quiet mode in which the image is formed at a predetermined formation speed, a normal mode in which the image is formed at a faster formation speed than the quiet mode, and an urgent mode in which an image formation process in the quiet mode or the normal mode is interrupted to form the image. The quiet mode is settable on the mobile terminal. The image forming apparatus forms the image in the urgent mode when the mode information inputted from the external device indicates the urgent mode and setting information indicating the quiet mode is acquired from the mobile terminal.

DETAILED DESCRIPTION

Figure 1:
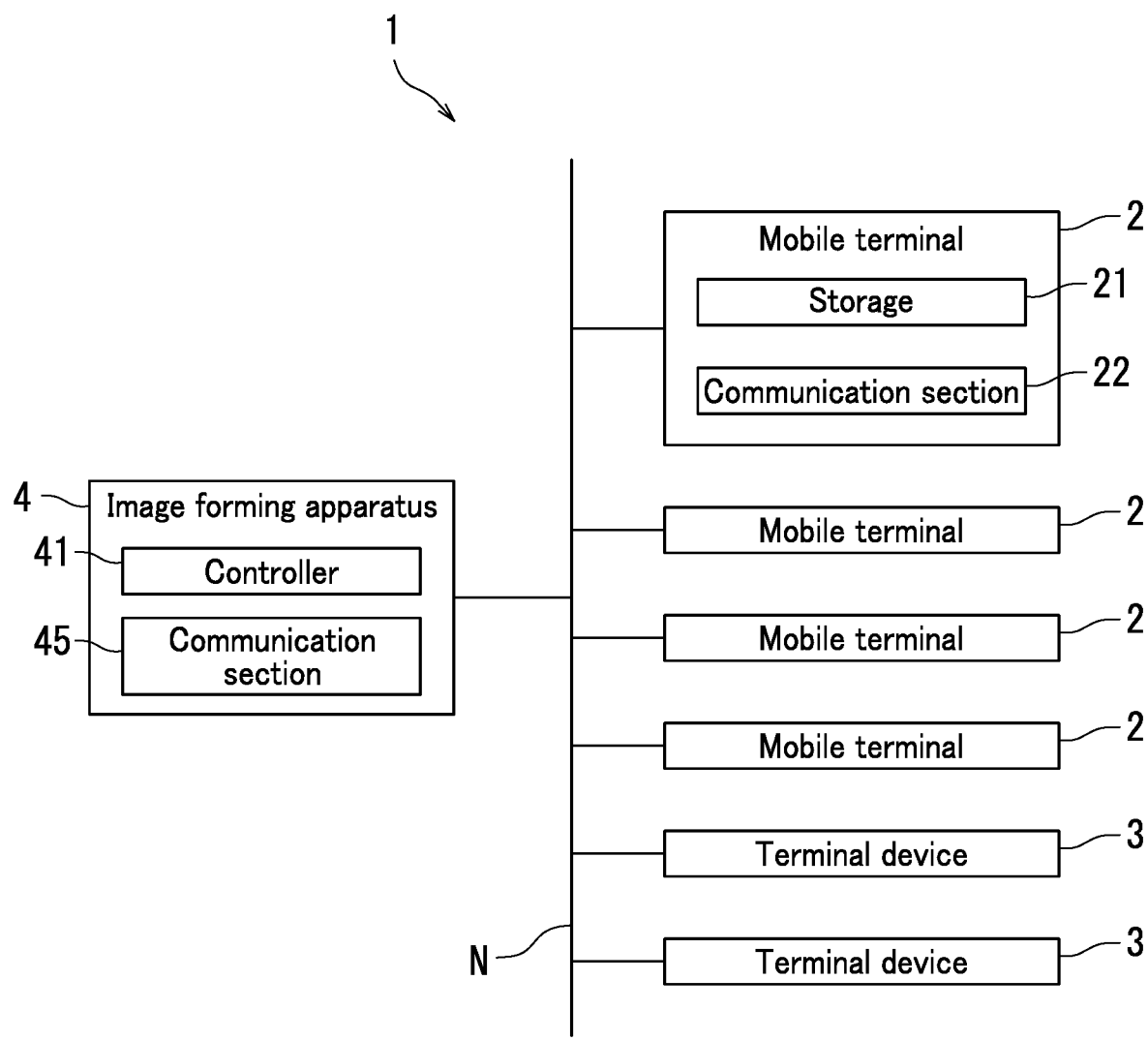
FIG. 1 is a block diagram illustrating an image forming system according to a first embodiment of the present disclosure.

Embodiments of the present disclosure will be described as follows with reference to the drawings. However, the present disclosure is not limited to the following embodiments. It should be noted that elements in the drawings that are the same or equivalent are labelled using the same reference signs and description thereof is not repeated.

First Embodiment

An image forming system 1 according to a first embodiment of the present disclosure will be described with reference to FIG. 1. FIG. 1 is a block diagram illustrating the image forming system 1 according to the first embodiment of the present disclosure. As illustrated in FIG. 1, the image forming system 1 includes a plurality of mobile terminals 2, a plurality of terminal devices 3, and an image forming apparatus 4.

The image forming apparatus 4 is a multifunction peripheral. A multifunction peripheral includes at least two of the following functions, for example: a copy function, a printing function, and a facsimile function. The image forming apparatus 4 forms an image on paper S at a formation speed according to mode information. The mode information indicates one of the following modes: a quiet mode, a normal mode, or an urgent mode.

The image forming apparatus 4 forms an image on the paper S at a predetermined formation speed in the quiet mode. The image forming apparatus 4 forms an image on the paper S at a faster formation speed than the quiet mode when in the normal mode. The image forming apparatus 4 interrupts a process being executed in the quiet mode or the normal mode to form an image on the paper S when in the urgent mode.

The image forming apparatus 4 includes a controller 41 and a communication section 45. The communication section 45 can communicate with each of the mobile terminals 2 through a communication network N. The communication section 45 can also communicate with each of the terminal devices 3 through the communication network N. The controller 41 directs the communication section 45 to communicate with the mobile terminal 2 and the terminal device 3 through the communication network N.

The communication network N is the Internet or a dedicated link such as wireless communication, for example. An example of the wireless communication is BLUETOOTH (registered Japanese trademark). The wireless communication also includes optical communication. In the optical communication, the mobile terminal 2 and the image forming apparatus 4 perform communication using light.

The mobile terminal 2 is carried by a carrier. The carrier is a person in proximity to the image forming apparatus 4, including a user of the image forming apparatus 4, for example. The mobile terminal 2 is a mobile phone such as a smartphone, a tablet personal computer, or a notebook personal computer, for example.

The mobile terminal 2 can communicate with the image forming apparatus 4 through the communication network N. The mobile terminal 2 includes storage 21, a communication section 22, a mobile display section, and a mobile operation section. The communication section 22 can communicate with the communication section 45 of the image forming apparatus 4 through the communication network N.

The quiet mode can be set on the mobile terminal 2. The mobile display section displays various screens to the carrier. The mobile operation section generates an operation signal according to an operation of the carrier. The quiet mode set by the carrier is stored in the storage 21.

For setting the quiet mode on the mobile terminal 2, the carrier acquires a setting screen of the image forming apparatus 4 through the communication network N, for example. The carrier inputs information indicating the quiet mode from the mobile operation section according to the setting screen displayed on the mobile display section. The storage 21 stores setting information generated based on the operation signal from the mobile operation section. The setting information includes information indicating whether or not the quiet mode has been set on the mobile terminal 2.

The terminal device 3 outputs the mode information to the image forming apparatus 4 according to an operation of the user of the image forming apparatus 4. The terminal device 3 is an example of an external device according to an aspect of the present disclosure. The terminal device 3 is a desktop personal computer, a notebook personal computer, a tablet personal computer, a facsimile machine, or a camera, for example. The mode information, for example, is output with image data to the image forming apparatus 4. The image data indicates an image of an original document.

Figure 2:
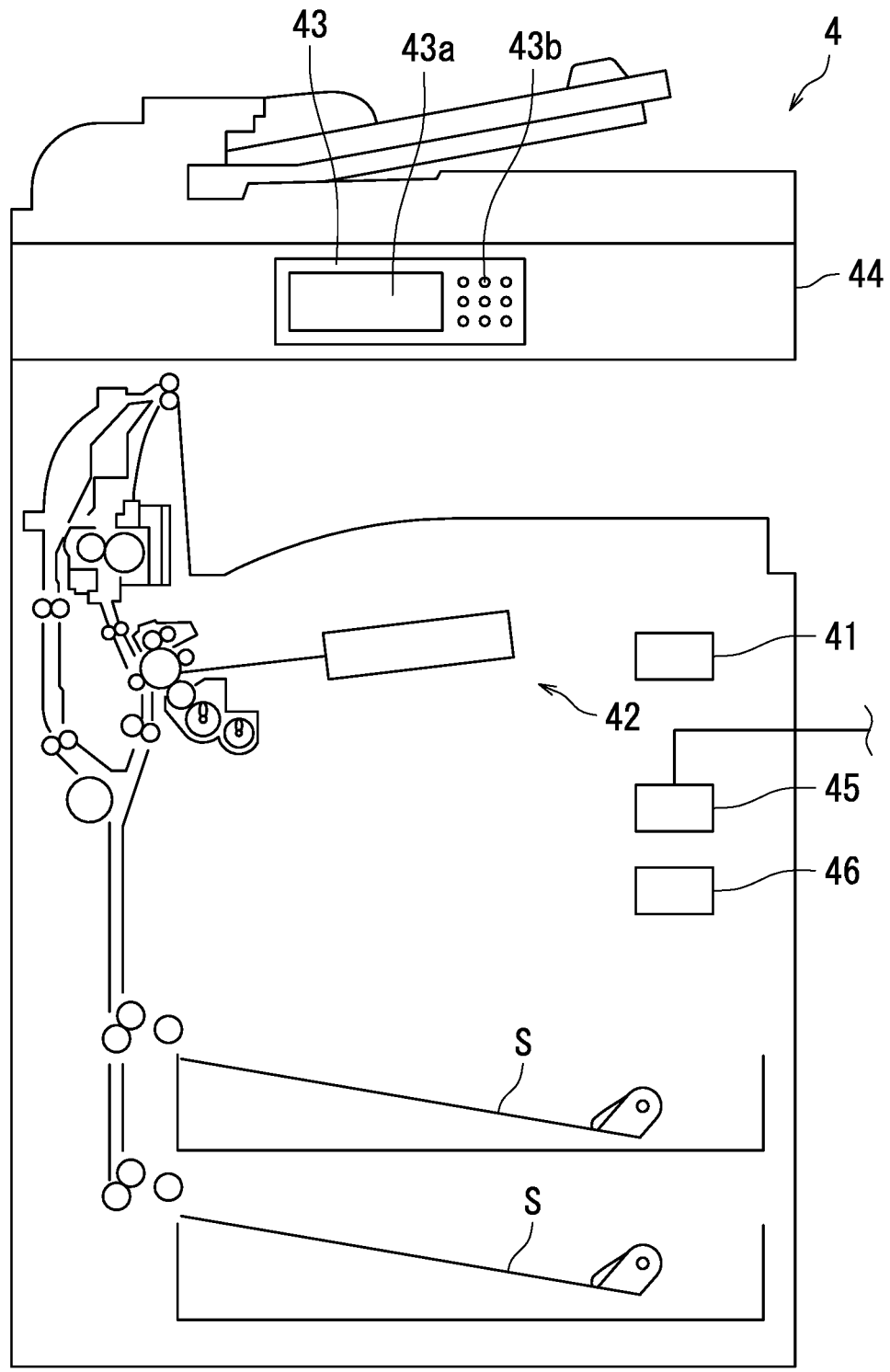
FIG. 2 is a diagram illustrating a configuration of an image forming apparatus from FIG. 1.

The image forming apparatus 4 will be described with reference to FIG. 2. FIG. 2 illustrates a configuration of the image forming apparatus 4. As illustrated in FIG. 2, the image forming apparatus 4 further includes an image forming section 42, an operation panel 43, an image reading section 44, and storage 46 in addition to the controller 41 and the communication section 45.

The controller 41 can set the image forming apparatus 4 to the quiet mode, the normal mode, or the urgent mode. The formation speed in the quiet mode is slower than the formation speed in the normal mode. As a result, operation noise of the image forming apparatus 4 is suppressed as compared to the normal mode. The formation speed in the normal mode is faster than the formation speed in the quiet mode. As a result, the amount of time required to form an image on the paper S is reduced as compared to the quiet mode.

A process that is executed in the urgent mode interrupts any process being executed in the quiet mode or the normal mode. As a result, the image forming apparatus 4 can complete a process in the urgent mode at a timing desired by the user, as compared to the quiet mode and the normal mode. Also in the urgent mode, an image is formed on the paper S at a formation speed equal to or faster than the formation speed of the normal mode. In the urgent mode of the image forming apparatus 4 according to the first embodiment, an image is formed on the paper S at a faster formation speed than the formation speed of the normal mode. Accordingly, the amount of time required to form an image on the paper S is reduced in the urgent mode.

The paper S is an example of a recording medium. The paper S is plain paper, copy paper, recycled paper, thin paper, thick paper, glossy paper or overhead projector (OHP) transparency, for example.

The image forming section 42 forms a toner mage on the paper S based on the image data. The image forming section 42 forms the toner image on the paper S at the formation speed of the normal mode, the quiet mode, or the urgent mode.

The image reading section 44 reads an original document and generates the image data. The image reading section 44 outputs the image data to the controller 41. The image reading section 44 is a scanner, for example.

The operation panel 43 includes a display section 43a and an operation section 43b. The operation section 43b includes hard keys. The operation section 43b outputs an operation signal according to an operation of the user of the image forming apparatus 4. Operations of the user include an operation to execute various settings of the image forming apparatus 4, for example.

The display section 43a includes a display. The display includes a touch panel function. The display section 43a displays various screens to the user of the image forming apparatus 4. The display section 43a also displays an operation screen showing input keys and the like, and functions as the operation section 43b.

Figure 3:
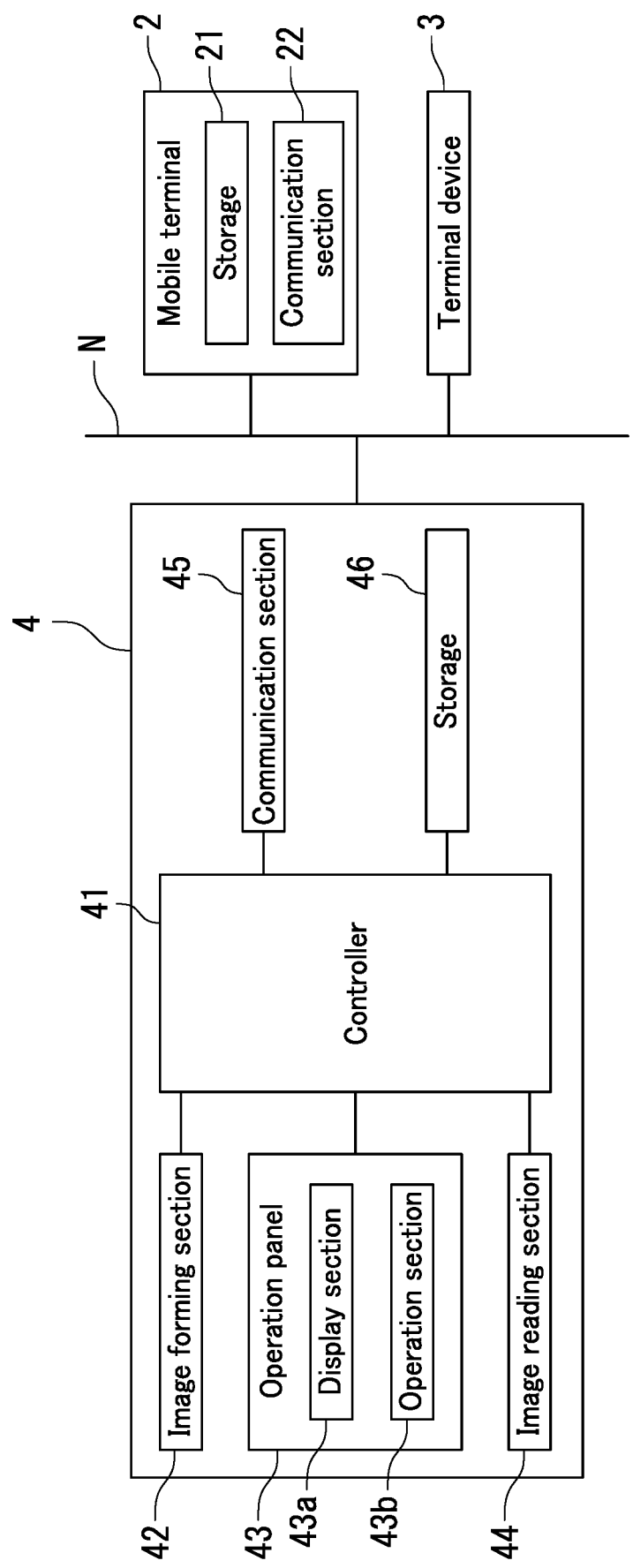
FIG. 3 is a block diagram illustrating the configuration of the image forming apparatus from FIG. 2.

The controller 41 will be further described with reference to FIG. 3. FIG. 3 is a block diagram illustrating a configuration of the image forming apparatus 4 according to the first embodiment. The storage 46 includes semiconductor memory such as read-only memory (ROM) and random-access memory (RAM). The ROM stores various computer programs to be executed by the controller 41, for example. The RAM stores the image data and setting information of the mobile terminal 2, for example.

The controller 41 controls the image forming section 42, the operation panel 43, and the image reading section 44 by executing the computer programs pre-stored in the storage 46. The controller 41 includes a central processing unit (CPU), for example.

The controller 41 directs the image forming section 42 to form the toner image on the paper S based on the image data inputted from the terminal device 3. Note that the image data may be inputted from a camera using a USB function or a wireless function, for example. When using a camera, the mode information is inputted from the operation panel 43, for example.

The controller 41 sets the mode of the image forming apparatus 4 based on the mode information inputted from a terminal device 3 and the setting information stored in the storage 21 of a mobile terminal 2.

The controller 41 acquires the setting information from the mobile terminal 2 based on communication with the mobile terminal 2. The controller 41 directs the communication section 45 to acquire the setting information from the storage 21 of the mobile terminal 2. As a result, the controller 41 acquires the setting information from the communication section 22 of the mobile terminal 2 through the communication section 45.

The controller 41 stores the acquired setting information of the mobile terminal 2 in the storage 46. The controller 41 stores the setting information of the mobile terminal 2 in the storage 46 in association with individual information of the mobile terminal 2, for example. The controller 41, for example, acquires the setting information of the mobile terminal 2 when the image data is inputted to the image forming apparatus 4. Note that the controller 41 may acquire the setting information from the mobile terminal 2 at a predetermined interval.

The controller 41 determines whether the mode information indicates the normal mode, the quiet mode, or the urgent mode when the image data and the mode information are inputted to the image forming apparatus 4. The controller 41 refers to the setting information of the mobile terminal 2 stored in the storage 46 when the mode information indicates the normal mode. The controller 41 determines whether or not the setting information includes information indicating the quiet mode. The controller 41 sets the image forming apparatus 4 to the normal mode when the setting information does not include information indicating the quiet mode. As a result, the image forming apparatus 4 forms an image on the paper S at the formation speed of the normal mode.

The controller 41 sets the image forming apparatus 4 to the quiet mode when the setting information includes information that indicates the quiet mode. As a result, the image forming apparatus 4 forms an image on the paper S at the formation speed of the quiet mode.

In the image forming system 1, an image is formed on the paper S at the formation speed of the quiet mode so as to correspond with a setting of the carrier carrying the mobile terminal 2 even when the mode information indicating the normal mode is inputted to the image forming apparatus 4 from the user of the image forming apparatus 4 through the terminal device 3. As a result, the image forming system 1 can prevent discomfort to a person in proximity due to the operation noise of the image forming apparatus 4. The person in proximity to the image forming apparatus 4, for example, is a person located near the image forming apparatus 4 and a person who is sensitive to noise.

The controller 41 sets the image forming apparatus 4 to the quiet mode when the mode information indicates the quiet mode. As a result, the image forming apparatus 4 forms an image on the paper S at the formation speed of the quiet mode so as to correspond with the setting of the user of the image forming apparatus 4. As a result, the mode of the image forming apparatus 4 is set so as to correspond with the mode inputted from the user of the image forming apparatus 4, and discomfort to the user of the image forming apparatus 4 can be prevented.

The controller 41 sets the image forming apparatus 4 to the urgent mode when the mode information indicates the urgent mode. As a result, the image forming apparatus 4 forms an image on the paper S at the formation speed of the urgent mode so as to correspond with the setting of the user of the image forming apparatus 4.

In the image forming system 1 according to the first embodiment of the present disclosure, a process is executed that interrupts any process being executed in the quiet mode or the normal mode when the mode information indicating the urgent mode is inputted to the image forming apparatus 4 by the user of the image forming apparatus 4 through the terminal device 3. This is the case even when the mobile terminal 2 has set the quiet mode. Accordingly, the image forming apparatus 4 can complete a process at the timing desired by the user without waiting for the process being executed in the quiet mode or the normal mode to complete. As a result, convenience for the user can increase.

Note that the controller 41 may notify the mobile terminal 2 that the image is to be formed on the paper S at the formation speed of the urgent mode, for example, when the image forming apparatus 4 is set to the urgent mode so as to correspond with the mode inputted from the user of the image forming apparatus 4. As a result, the carrier can confirm in advance that the image forming apparatus 4 will form the image on the paper S at the formation speed of the urgent mode.

The controller 41 may also notify the terminal device 3 of the user that the image forming apparatus 4 has been set to the quiet mode when the image forming apparatus 4 has been set to the quiet mode even though the mode information inputted from the user indicates the normal mode. As a result, the user who has inputted the mode information indicating the normal mode to the image forming apparatus 4 can know in advance that the image forming apparatus 4 will form the image on the paper S at the formation speed of the quiet mode so as to correspond with the setting of the carrier.

Second Embodiment

Continuing, the image forming system 1 according to a second embodiment of the present disclosure will be described with reference to FIG. 3. In the first embodiment of the present disclosure, the image forming apparatus 4 is set to the quiet mode based on the setting information of a mobile terminal 2. In the second embodiment of the present disclosure however, the mode of the image forming apparatus 4 is set based on setting information and location information of a mobile terminal 2.

The controller 41 generates the location information of the mobile terminal based on communication with the mobile terminal 2. Specifically, the controller 41 measures the distance between the image forming apparatus 4 and the mobile terminal 2 based on wireless communication time with the mobile terminal 2. The controller 41 generates the location information of the mobile terminal 2 based on the measured distance.

The controller 41 stores the generated location information in the storage 46. The controller 41, for example, stores the setting information and the location information of the mobile terminal 2 in the storage 46 in association with the individual information of the mobile terminal 2. The controller 41 generates the location information of the mobile terminal 2 when the image data is inputted to the image forming apparatus 4. Note that the controller 41 may generate the location information of the mobile terminal 2 at a predetermined interval.

The controller 41 determines whether the mode information indicates the normal mode, the quiet mode, or the urgent mode when the image data and the mode information are inputted to the image forming apparatus 4. The controller 41 determines whether or not the setting information of the mobile terminal 2 within a predetermined range of the image forming apparatus 4 includes information indicating the quiet mode when the mode information indicates the normal mode. Specifically, the controller 41 refers to the location information stored in the storage 46 and determines Whether or not the mobile terminal 2 is located within the predetermined range of the image forming apparatus 4. The controller 41 sets the image forming apparatus 4 to the normal mode when the mobile terminal 2 is not located within the predetermined range. As a result, the image forming apparatus 4 forms an image on the paper S at the formation speed of the normal mode.

The controller 41 refers to the setting information of the mobile terminal 2 within the predetermined range stored in the storage 46 when the mobile terminal 2 is located within the predetermined range. The controller 41 determines whether or not the setting information of the mobile terminal 2 within the predetermined range includes information that indicates the quiet mode. The controller 41 sets the image forming apparatus 4 to the normal mode when the setting information does not include information indicating the quiet mode. As a result, the image forming apparatus 4 forms an image on the paper S at the formation speed of the normal mode.

The controller 41 sets the image forming apparatus 4 to the quiet mode when the setting information includes information that indicates the quiet mode. As a result, the image forming apparatus 4 forms an image on the paper S at the formation speed of the quiet mode.

In the image forming system 1, an image is formed on the paper S at the formation speed of the quiet mode so as to correspond with the setting of the carrier located within the predetermined range of the image forming apparatus 4 even when the mode information indicating the normal mode is inputted to the image forming apparatus 4 from the user through a terminal device 3. As a result, discomfort to the carrier located near the image forming apparatus 4 in the image forming system 1 due to the operation noise of the image forming apparatus 4 can be prevented.

The controller 41 sets the image forming apparatus 4 to the quiet mode when the mode information indicates the quiet mode. As a result, the image forming apparatus 4 forms an image on the paper S at the formation speed of the quiet mode so as to correspond with the setting of the user of the image forming apparatus 4.

The controller 41 sets the image forming apparatus 4 to the urgent mode when the mode information indicates the urgent mode. As a result, the image forming apparatus 4 forms an image on the paper S at the formation speed of the urgent mode so as to correspond with the setting of the user of the image forming apparatus 4.

Similarly to the image forming system 1 according to the first embodiment of the present disclosure, in the image forming system 1 according to the second embodiment of the present disclosure, a process is executed that interrupts any process being executed in the quiet mode or the normal mode when the mode information indicating the urgent mode is inputted to the image forming apparatus 4 from the user of the image forming apparatus 4 through the terminal device 3. This is the case even when the mobile terminal 2 has set the quiet mode. Accordingly, the image forming apparatus 4 can complete the process at the timing desired by the user without waiting for the process being executed in the quiet mode or the normal mode to complete. As a result, the convenience for the user can increase.

Figure 4:
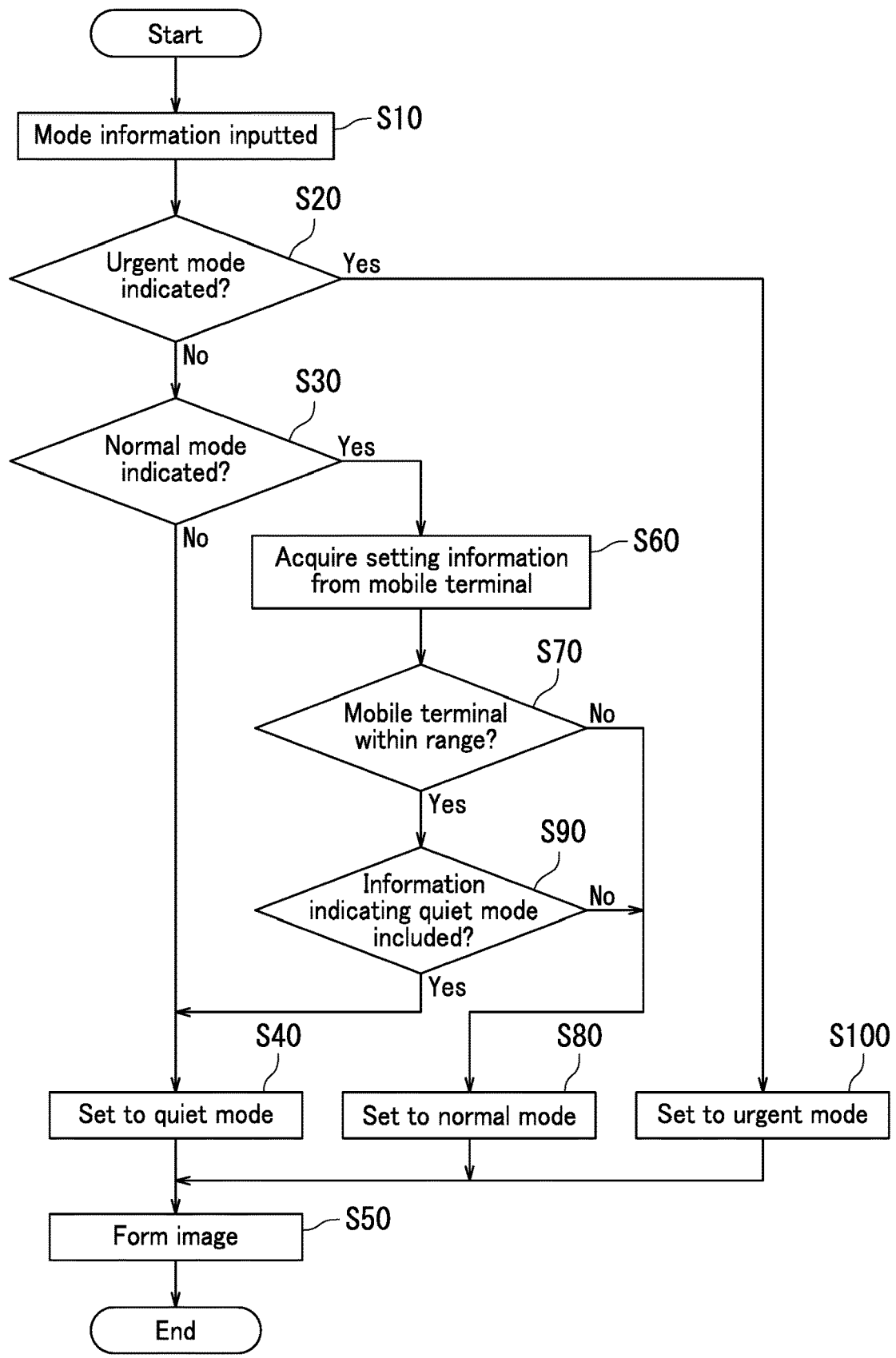
FIG. 4 is a flowchart illustrating image formation control of a controller according to a second embodiment of the present disclosure.

Image formation control performed by the controller 41 according to the second embodiment of the present disclosure will be described with reference to FIG. 4. FIG. 4 is a flowchart illustrating the image formation control of the controller 41 according to the second embodiment of the present disclosure. In Step S10 as illustrated in FIG. 4, the image data and the mode information are inputted to the controller 41 from the terminal device 3. In Step S20, the controller 41 determines whether or not the mode information indicates the urgent mode.

When the mode information does not indicate the urgent mode (No in Step S20), the controller 41 determines whether or not the mode information indicates the normal mode in Step S30.

When the mode information does not indicate the normal mode (No in Step S30), the controller 41 sets the image forming apparatus 4 to the quiet mode in Step S40, In Step S50, the controller 41 directs the image forming section 42 to form an image on the paper S after the image forming apparatus 4 has been set to the quiet mode, and the image formation control ends.

When the mode information indicates the normal mode (Yes in Step S30), the controller 41 acquires the setting information of the mobile terminal 2 and generates the location information of the mobile terminal 2 based on communication with the mobile terminal 2 in Step S60. In Step S70, the controller 41 determines whether or not the mobile terminal 2 is located within the predetermined range of the image forming apparatus 4 based on the location information of the mobile terminal 2 after the setting information of the mobile terminal 2 has been acquired and the location information of the mobile terminal 2 has been generated.

When the mobile terminal 2 is not located within the predetermined range (No in Step S70), the controller 41 sets the image forming apparatus 4 to the normal mode in Step S80. In Step S50, the controller 41 directs the image forming section 42 to form an image on the paper S after the normal mode has been set, and the image formation control ends.

When the mobile terminal 2 is located within the predetermined range (Yes in Step S70), the controller 41 determines whether or not the setting information includes information indicating the quiet mode in Step S90.

When the setting information includes information indicating the quiet mode (Yes in Step S90), the controller 41 sets the image forming apparatus 4 to the quiet mode in Step S40. In Step S50, the controller 41 directs the image forming section 42 to form an image on the paper S after the image forming apparatus 4 has been set to the quiet mode, and the image formation control ends.

When the setting information does not include information indicating the quiet mode (No in Step S90), the controller 41 sets the image forming apparatus 4 to the normal mode in Step S80, In Step S50, the controller 41 directs the image forming section 42 to form an image on the paper S after the normal mode has been set, and the image formation control ends.

When the mode information indicates the urgent mode (Yes in Step S20), the controller 41 sets the image forming apparatus 4 to the urgent mode in Step S100. In Step S50, the controller 41 directs the image forming section 42 to form an image on the paper S after the urgent mode has been set, and the image formation control ends.

The image forming system 1 according to the first and second embodiments of the present disclosure is described above with reference to FIGS. 1 to 4. However, the present disclosure is not limited to the first and second embodiments, and may be practiced in various forms without deviating from the essence thereof.

For example, in the second embodiment of the present disclosure, the controller 41 refers to the setting information of the mobile terminal 2 within the predetermined range of the image forming apparatus 4. However, the present disclosure is not limited hereto. The controller 41 of the present disclosure need only acquire the setting information from a mobile terminal 2 carried by a certain carrier. For example, the controller 41 may acquire the setting information from the mobile terminal 2 located nearest to the image forming apparatus 4, among a plurality of mobile terminals 2. Accordingly, the mode of the image forming apparatus 4 is set so as to correspond with the setting of the carrier nearest to the image forming apparatus 4. As a result, discomfort to the carrier nearest to the image forming apparatus 4 due to the operation noise of the image forming apparatus 4 can be prevented.

For another example, the controller 41 may refer to the setting information of a predetermined mobile terminal 2. As a result, for example, the mode of the image forming apparatus 4 is set so as to correspond with the setting of a certain carrier who is sensitive to the operation noise of the image forming apparatus 4, and discomfort to the designated carrier due to the operation noise of the image forming apparatus 4 can be prevented.

For another example, according to the second embodiment of the present disclosure, the controller 41 generates the location information of the mobile terminal 2 based on communication time with the mobile terminal 2. However, the present disclosure is not limited hereto. The controller 41 need only generate the location information of the mobile terminal 2. For example, the controller 41 includes a GPS function. The controller 41 can generate the location of the image forming apparatus 4 using the GPS function. The mobile terminal 2 also includes a GPS function, for example. The mobile terminal 2 can generate the location of the mobile terminal 2 using the GPS function. The controller 41 may acquire the location of the mobile terminal 2 through the communication network N and generate the location information of the mobile terminal 2 based on the locations of the mobile terminal 2 and the image forming apparatus 4.

For another example, according to the first and second embodiments of the present disclosure, the image forming apparatus 4 refers to the image data and the mode information inputted through the terminal device 3. However, the present disclosure is not limited hereto. The image forming apparatus 4 of the present disclosure need only refer to the inputted mode information. For example, the image forming apparatus 4 may refer to the image data inputted through the image reading section 44 and the mode information inputted through the operation panel 43.

For another example, according to the first and second embodiments of the present disclosure, the controller 41 acquires the setting information stored in the storage 21 of the mobile terminal 2. However, the present disclosure is not limited hereto. The controller 41 of the present disclosure need only acquire the setting information indicating the quiet mode from the mobile terminal 2. For example, the controller 41 may acquire the setting information indicating the quiet mode from the mobile terminal 2 when the mobile terminal 2 is set to a vibrate mode. As a result, the work of the carrier inputting information indicating the quiet mode to the mobile terminal 2 can decrease, and the convenience of the image forming system 1 can increase. Note that the mobile terminal 2 can be set to the vibrate mode, and the vibrate mode suppresses an alert sound of the mobile terminal 2.

It should be noted that the drawings schematically illustrate elements of configuration in order to facilitate understanding, and properties of elements of configuration illustrated in the drawings, such as thickness and length thereof, may differ from actual properties thereof in order to facilitate preparation of the drawings. Furthermore, properties of elements of configuration described in the above embodiments, such as shapes and dimensions, are merely examples and are not intended as specific limitations. The elements may be altered without substantially deviating from the configuration of the present disclosure.

What is claimed is:

1. An image forming system comprising:
   an image forming apparatus configured to form an image on a recording medium;
   a plurality of mobile terminals configured to communicate with the image forming apparatus through a communication network; and
   a plurality of terminal devices configured to communicate with the image forming apparatus, wherein
   image data and mode information are inputted to the image forming apparatus from one of the terminal devices,
   the mode information indicates one mode among a quiet mode in which the image is formed at a predetermined formation speed, a normal mode in which the image is formed at a faster formation speed than the quiet mode, and an urgent mode in which an image formation process in the quiet mode or the normal mode is interrupted to form the image,
   each of the mobile terminals is settable to a vibrate mode in which an alert sound of the mobile terminal is suppressed,
   setting information indicating the quiet mode is set on each of the mobile terminals when the mobile terminal is set to the vibrate mode,
   the image forming apparatus
      generates location information indicating positions of the mobile terminals based on communication between the image forming apparatus and the mobile terminals,
      determines whether or not the mode information indicates the urgent mode when the mode information and the image data are inputted from the one of the terminal devices,
      determines whether the mode information indicates the normal mode or the quiet mode when determining that the mode information does not indicate the urgent mode,
      sets to the quiet mode and forms the image based on the image data in the quiet mode when determining that the mode information indicates the quiet mode,
      determines whether or not the setting information is acquired from a mobile terminal located nearest to the image forming apparatus when determining that the mode information indicates the normal mode,
      sets to the quiet mode, forms the image based on the image data in the quiet mode and notifies the one of the terminal devices that the quiet mode is set when determining that the setting information is acquired from the mobile terminal located nearest to the image forming apparatus,
      sets to the normal mode and forms the image based on the image data in the normal mode when determining that the setting information is not acquired from the mobile terminal located nearest to the image forming apparatus, and
      sets to the urgent mode, forms the image based on the image data in the urgent mode, and notifies the mobile terminal located nearest to the image forming apparatus that the urgent mode is set when determining that the mode information indicates the urgent mode, and
   the image data indicates the image.

2. The image forming system according to claim 1, wherein
   a formation speed of the urgent mode is equal to or faster than the formation speed of the normal mode.

* * * * *